June 16, 1964     C. E. GREUZARD     3,137,079
TEACHING AND TESTING MACHINE
Filed Aug. 1, 1962     2 Sheets-Sheet 1

CHARLES E. GREUZARD
INVENTOR.
KENDRICK and STOLZY
BY
Attorneys

June 16, 1964     C. E. GREUZARD     3,137,079
TEACHING AND TESTING MACHINE

Filed Aug. 1, 1962                                2 Sheets-Sheet 2

CHARLES E. GREUZARD
INVENTOR.
KENDRICK and STOLZY
BY
*Attorneys*

United States Patent Office 3,137,079
Patented June 16, 1964

3,137,079
TEACHING AND TESTING MACHINE
Charles E. Greuzard, 13018 Le Floss, Norwalk, Calif.
Filed Aug. 1, 1962, Ser. No. 213,932
1 Claim. (Cl. 35—9)

This invention relates to devices for use in self-instruction, and more particularly to apparatus for use in teaching and testing students.

In the past, teaching machines have been relatively large in size and have required a considerable number of expensive component parts. This and other disadvantages of the prior art are overcome in accordance with the present invention by providing support means, two interconnected sets of a plurality of electrical contacts on the support means, a question plaque to close a selected one of the contacts in one of the sets, an answer plaque corresponding to the question plaque to close a selected one of the contacts in the other of the sets, and means to indicate the closure of the contacts. Thus, when one of a plurality of question plaques are placed in contact with the support means contacts and a corresponding one of a plurality of answer plaques are likewise placed thereon, the means to indicate the closure may be simply an electrical lamp. Such a teaching and testing machine is therefore of a relatively small size and requires very few and inexpensive components.

According to a feature of the present invention, the question and answer plaques each may include a body having means on the rear face of it to close an electrical contact, and means to hold a question or answer card on the front face of the body.

These and other advantages of the present invention may be better understood from the following description when considered in connection with the accompanying drawings.

In the drawings which are to be regarded as merely illustrative:

Figure 1:
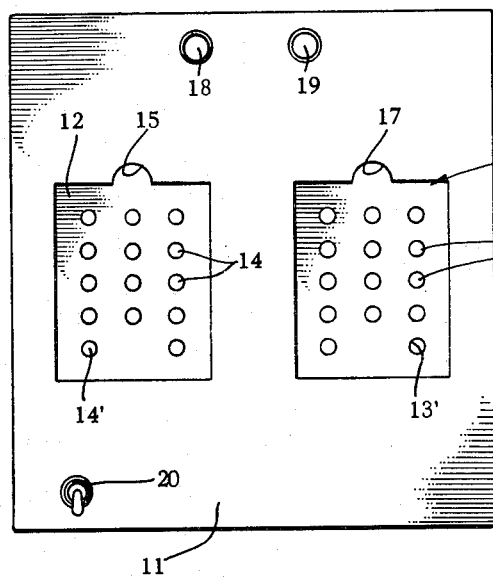
FIG. 1 is a top plan view of a teaching and testing machine constructed in accordance with the present invention.
Figure 3:
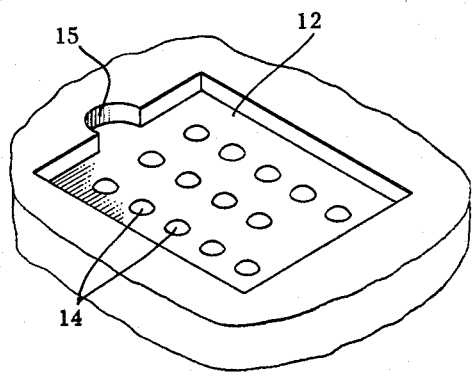
FIG. 3 is a broken away perspective view of a top portion of the machine shown in FIG. 1.
Figure 2:
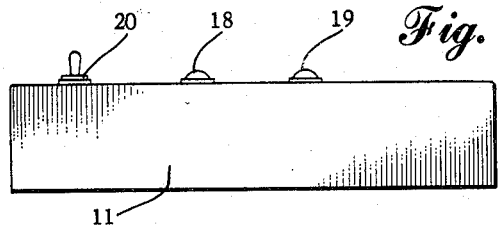
FIG. 2 is a front elevational view of the machine shown in FIG. 1.

In the drawing in FIG. 1, the teaching and testing machine of the present invention is indicated generally at 10 including a dielectric housing 11 which is provided with recesses 12 and 13 therein. Recess 12 is shown in FIG. 3; recesses 12 and 13 may be identical. Recess 12 is provided with fourteen conductive terminals or contacts 14. Recess 12 has a notch at 15, the function of which will be explained subsequently. Recess 13 is provided with conductive terminals 16 identical to terminals 14 and a notch 17 identical to notch 15.

Figure 4:
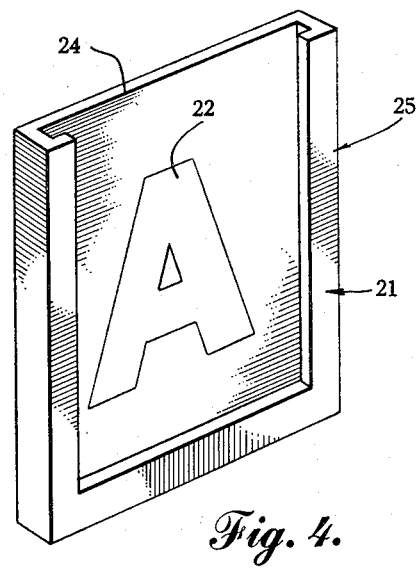
FIG. 4 is a perspective view of a question or answer plaque constructed in accordance with the present invention.
Figure 6:
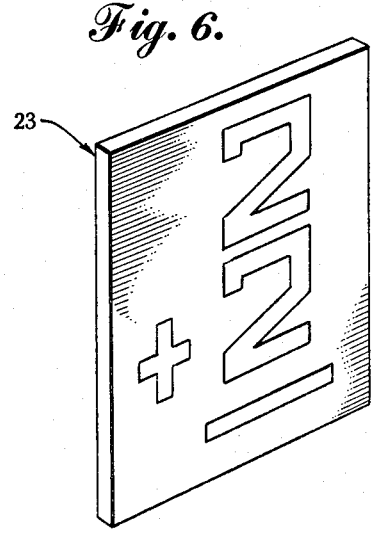
FIG. 6 is a perspective view of a question card which may be slidably mounted in the plaque shown in FIG. 4.

A red lamp 18 and a green lamp 19 are located on top of housing 11. The same is true of a switch 20. A plaque 21 is shown in FIG. 4. Twenty-six such plaques may be employed with the machine 10 shown in FIG. 1. Any one of thirteen question plaques may be located in recess 12. When a particular corresponding one of thirteen answer plaques is located in recess 13 and switch 20 is turned on, green lamp 19 will be illuminated. When switch 20 is turned on and any non-corresponding pair of plaques are located in recesses 12 and 13, red lamp 18 will be illuminated. If desired, the answer plaques may be a different color than the question plaques. Each question plaque may have a letter such as the letter "A" indicated at 22 in FIG. 4 painted upon the front surface thereof. Any number of questions may be associated with a question plaque such as, for example, by means of a card such as card 23 shown in FIG. 6, which may be slidably mounted in plaque 21 between a dielectric body 24 and an overhanging peripheral flange 25 shown in FIG. 4.

Figure 7:
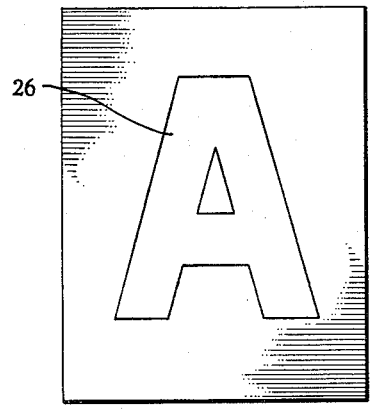
FIG. 7 is a rear elevational view of the card shown in FIG. 6.

For example, the sum question two plus two may be illustrated on question card 23. The corresponding answer card located in the corresponding plaque would have the numeral 4 thereon. The back of question card 23 may have the letter "A" printed thereon as indicated at 26 in FIG. 7 to indicate the correspondence between question card 23 and plaque 21.

In accordance with the foregoing, it will be appreciated that thirteen question cards and thirteen answer cards will be provided for each of the thirteen question plaques and thirteen answer plaques. A plurality of question and answer cards may be provided depending upon the subject matter under study.

Figure 5:
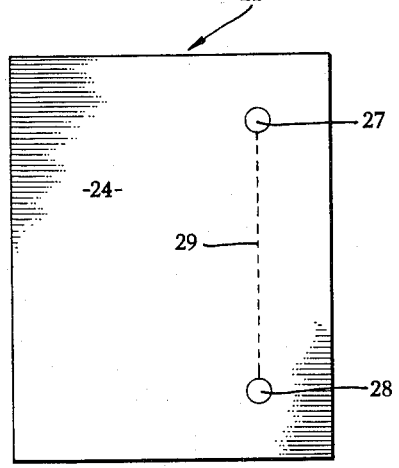
FIG. 5 is a rear elevational view of the plaque shown in FIG. 4.

The manner in which the plaques are employed to illuminate green lamp 19 is by the use of at least two terminals or contacts 27 and 28 as shown on the rear surface of plaque 21 in FIG. 5, terminals 27 and 28 may be connected by a conductor indicated by dotted line 29 embedded in dielectric body 24. The terminal 28 and the corresponding terminal on each of the question plaques will be in exactly the same position on each plaque. The position of terminal 27 and any other corresponding terminal on any of the question plaques will be at different positions to contact different ones of terminals 14. Note will be taken that the terminal 28 and the corresponding terminal on each of the corresponding question plaques will contact only terminal 14' of the set of terminals 14. The same is true of one terminal on each of the answer plaques which will contact a terminal 13' of a set of terminals 13 shown in FIG. 1.

Figure 8:
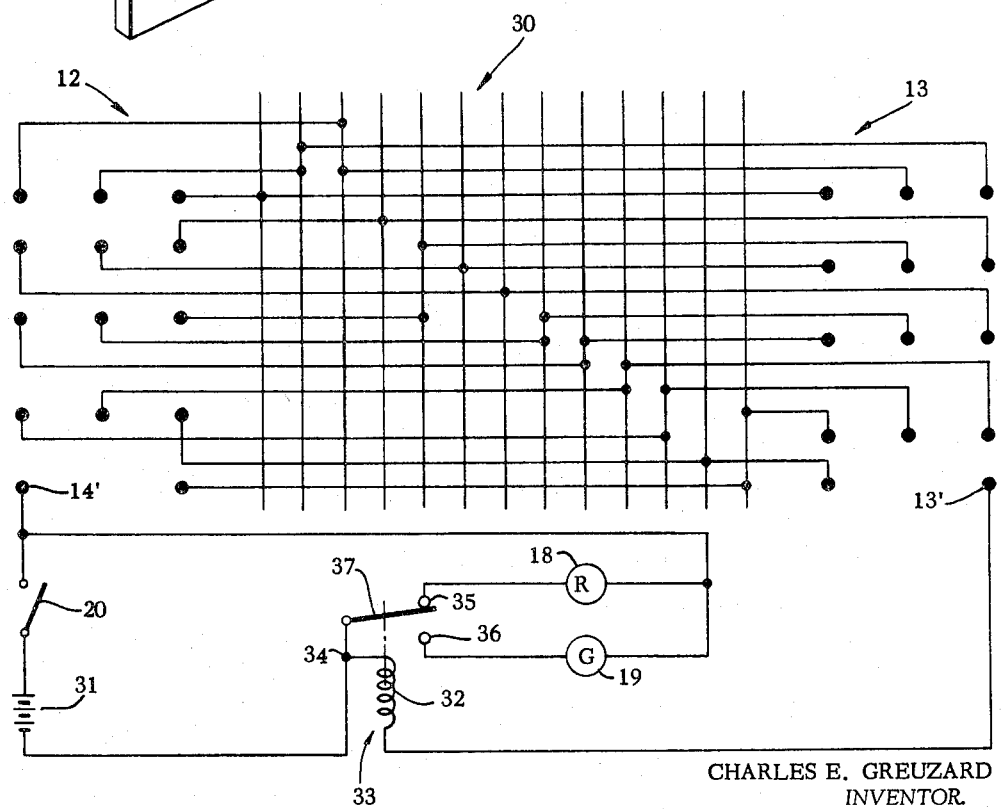
FIG. 8 is a schematic diagram of the electrical circuit of the machine shown in FIG. 1.

The circuit of the present invention is shown in FIG. 8 including a set of terminals 14 including terminal 14', a set of terminals 13 including terminal 13', a set of wires 30 to interconnect terminals 14 with terminals at random, switch 20, red lamp 18 and green lamp 19. Note will be taken that a battery source of potential 31 is connected from switch 20. Switch 20 is connected serially from the positive terminal of battery 31 to terminal 14'. A relay winding 32 is connected from the negative terminal of battery 31 to terminal 13'. Relay winding 32 is a position of the relay indicated at 33 including a pole 34 which is automatically connected to either a normally closed contact 35 or a normally open contact 36 by an arm 37. Red and green lamps 18 and 19, respectively, are connected from contacts 35 and 36 to terminal 14'.

From the foregoing, note will be taken that a connection is made by corresponding question and answer plaques from terminals 14' and 13', respectively, to a particular one in each of the sets of terminals 14 and 13 respectively. The terminal in each set is, in turn, connected by one of the wires in set 30. When a series circuit is then completed through switch 20, relay 33 is energized and green lamp is illuminated. When non-corresponding plaques are placed in recesses 12 and 13, red lamp 18 will be energized.

From the foregoing, it will be appreciated that the teaching and testing machine of the present invention may be constructed with a relatively small size and requires few inexpensive component parts.

Although only one specific embodiment of the invention has been shown and described, many changes and modifications thereof will of course suggest themselves to those skilled in the art. The embodiment of the invention shown and described has been selected for this disclosure for purpose of illustration only. Hence, the invention is not to be limited to the specific embodiment of the invention disclosed herein, the true scope thereof being defined only in the appended claim.

What is claimed is:

A teaching and testing machine comprising: dielectric support means having an upper surface with two recesses therein; a first set of spaced conductive terminals located at the bottom of one of said recesses; a second set of spaced conductive terminals located at the bottom of the other of said recesses; means electrically connecting each one of said terminals in said first set with a different corresponding one in said second set; a dielectric question plaque having at least two spaced conductive terminals on the rear face thereof, said question plaque having a shape conforming to and fitting in said one recess, said two question plaque terminals being positioned to contact two terminals of said first set; an insulated conductor electrically connecting said two question plaque terminals; a dielectric answer plaque having at least two spaced conductive terminals on the rear face thereof, said answer plaque having a shape conforming to and fitting in said other recess, said two answer plaque terminals being positioned to contact two terminals of said second set; an insulated conductor electrically connecting said two answer plaque terminals; and means to indicate when said plaque terminals contact corresponding terminals in said sets thereof.

References Cited in the file of this patent

UNITED STATES PATENTS

| | | |
|---|---|---|
| 2,872,741 | Krueger et al. | Feb. 10, 1959 |
| 3,015,895 | Stall | Jan. 9, 1962 |